United States Patent
Fehrenbach et al.

(10) Patent No.: US 6,329,015 B1
(45) Date of Patent: Dec. 11, 2001

(54) METHOD FOR FORMING SHAPED HOLES

(75) Inventors: Jeffrey Arnold Fehrenbach; John Howard Starkweather, both of Cincinnati; Michael Beverley, West Chester, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/576,921

(22) Filed: May 23, 2000

(51) Int. Cl.⁷ .......................................................... B41N 1/24
(52) U.S. Cl. ............................ 427/142; 427/289; 427/271
(58) Field of Search ............................ 438/748; 427/142, 427/289, 271, 126.2; 451/136

(56) References Cited

U.S. PATENT DOCUMENTS

| | | |
|---|---|---|
| 5,800,231 | * 9/1998 | De Haas et al. ................................... |
| 6,004,620 | * 12/1999 | Camm ............................................... |
| 6,042,879 | * 3/2000 | Draghi et al. ..................................... |

FOREIGN PATENT DOCUMENTS

761386-A1 * 3/1997 (EP) ..................................................

* cited by examiner

Primary Examiner—Caridad Everhart
(74) Attorney, Agent, or Firm—Andrew C. Hess; V. Ramaswamy

(57) ABSTRACT

A method of forming a shaped hole in a substrate, including substrates protected by coatings, as is the case where an air-cooled component has a thermal barrier coating for protection from a hostile thermal environment, such as the turbine, combustor and augmentor sections of a gas turbine engine. In particular, cooling holes are formed in an air-cooled component after a ceramic layer has been deposited on the surface of the component without damaging or spalling the ceramic layer. Processing steps generally include forming a hole through the ceramic layer and a substrate protected by the ceramic layer, thereby defining an opening at the surface of the ceramic layer. The diameter of the hole is less than the final size required for the cooling hole. A high-pressure abrasive fluid stream is then directed into the hole to enlarge the cross-section of the hole and impart a noncircular shape to the opening by removing portions of the substrate and ceramic layer without removing the ceramic layer surrounding the resulting noncircular-shaped opening. In a preferred embodiment, the abrasive fluid stream is traversed across the surface of the ceramic through a series of nested patterns that are not concentric with the central axis of the hole. Preferably, the hole acquires the desired noncircular shape in the ceramic layer, but retains a circular shape in the substrate.

20 Claims, 1 Drawing Sheet

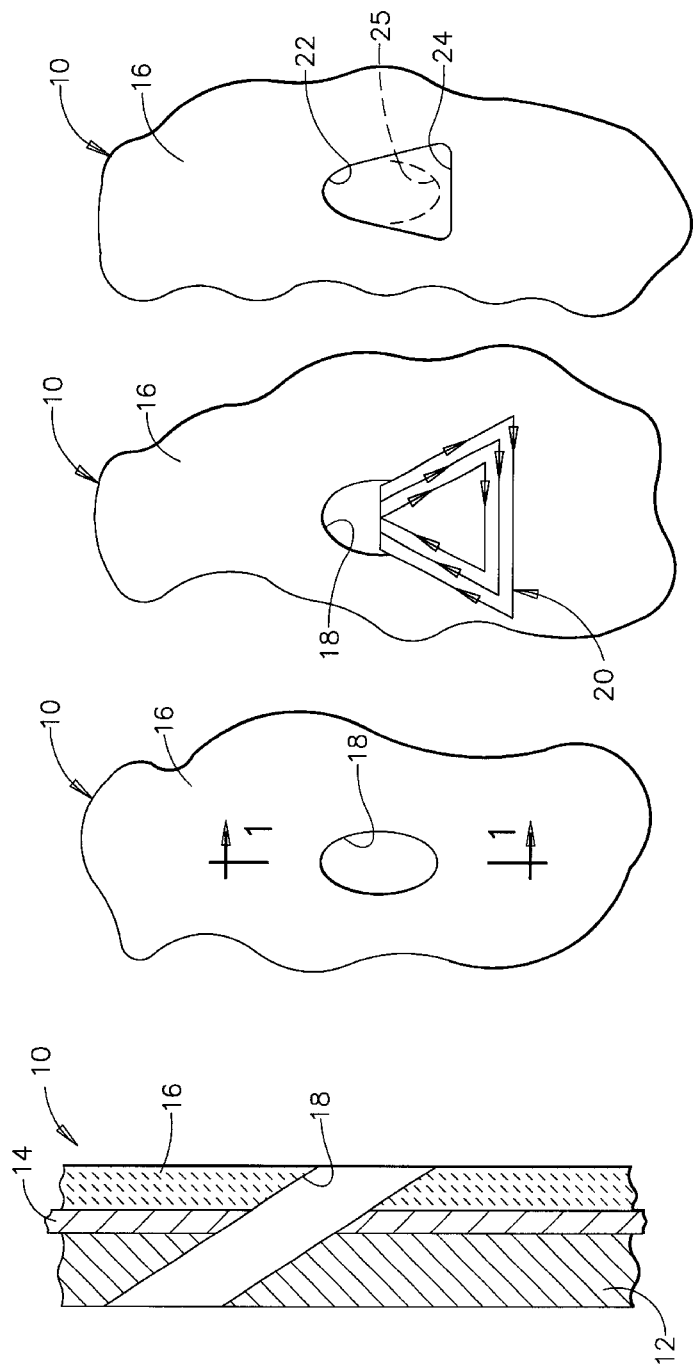

METHOD FOR FORMING SHAPED HOLES

FIELD OF THE INVENTION

The present invention relates to air-cooled components, such as a component of a gas turbine engine. More particularly, this invention is directed to a method for forming shaped cooling holes in a component, including those having a thermal barrier coating.

BACKGROUND OF THE INVENTION

The operating environment within a gas turbine engine is both thermally and chemically hostile. Significant advances in high temperature alloys have been achieved through the formulation of iron, nickel and cobalt-base superalloys, though components formed from such alloys often cannot withstand long service exposures if located in certain sections of a gas turbine engine, such as the turbine, combustor or augmentor. A common solution is to protect the surfaces of such components with an environmental coating system, such as an aluminide coating or a thermal barrier coating (TBC) system. The latter typically includes an environmentally-resistant bond coat and a thermal barrier coating of ceramic deposited on the bond coat. Bond coats are typically formed from an oxidation-resistant alloy such as MCrAlY where M is iron, cobalt and/or nickel, or from a diffusion aluminide or platinum aluminide that forms an oxidation-resistant intermetallic. During high temperature excursions, these bond coats form an oxide layer or scale that bonds the ceramic layer to the bond coat. Zirconia ($ZrO_2$) that is partially or fully stabilized by yttria ($Y_2O_3$), magnesia (MgO) or other oxides has been widely employed as the material for the ceramic layer. The ceramic layer is typically deposited by air plasma spraying (APS), low pressure plasma spraying (LPPS), or a physical vapor deposition (PVD) technique, such as electron beam physical vapor deposition (EBPVD) which yields a strain-tolerant columnar grain structure.

While thermal barrier coating systems provide significant thermal protection to the underlying component substrate, internal cooling of components such as turbine blades (buckets) and nozzles (vanes) is generally necessary, and may be employed in combination with or in lieu of a thermal barrier coating. Airfoils of turbine blades and nozzles of a gas turbine engine often require a complex cooling scheme in which cooling air flows through the airfoil and is then discharged through carefully configured cooling holes. For example, diffuser cooling holes require noncircular openings at the surface of the airfoil in order to distribute the cooling film over the airfoil contour and therefore increase the effectiveness of the cooling film. The performance of a turbine airfoil is directly related to the ability to provide uniform cooling of its surfaces with a limited amount of cooling air. Consequently, processes by which cooling holes and their openings are formed and configured are often critical because the size and shape of each opening determine the amount of air flow exiting the opening and the distribution of the air flow across the surface of the airfoil, and affect the overall flow distribution within the cooling circuit containing the opening. Other factors, such as backflow margin, are also affected by variations in opening size.

For airfoils without a thermal barrier coating, cooling holes are typically formed by such conventional drilling techniques as electrical-discharge machining (EDM) and laser machining. Complex advanced casting practices have also been used to yield airfoil castings with dimensionally correct openings. However, EDM cannot be used to form cooling holes in an airfoil having a ceramic TBC since the ceramic is electrically nonconducting, and laser machining is prone to spalling the brittle ceramic TBC by cracking the interface between the airfoil substrate and the ceramic. Accordingly, cooling holes have been required to be cast or formed by EDM and laser machining prior to applying the TBC system, limiting the thickness of the TBC which can be applied or necessitating a final operation to remove ceramic from the cooling holes in order to reestablish the desired size and shape of the openings.

From the above, it can be seen that manufacturing an air-cooled airfoil protected by a TBC is complicated by the requirement that the cooling holes remain appropriately sized and shaped in order for the cooling film produced by the holes to uniformly cool the external surfaces of the airfoil. The service life of an air-cooled airfoil that has been coated with an insulating ceramic layer is detrimentally affected if the ceramic layer alters the shape or reduces the size of the cooling hole openings from that required by the airfoil design. Accordingly, a method is desired for producing an air-cooled airfoil that is protected by a TBC system yet has appropriately sized and shaped cooling holes and openings, and particularly noncircular-shaped diffuser-type openings that promote a uniform distribution of cooling film across the external surface of an airfoil.

SUMMARY OF THE INVENTION

The present invention is embodied in a method of forming a shaped hole in a substrate, including substrates protected by coatings, as is the case where an air-cooled component has a thermal barrier coating for protection from a hostile thermal environment, such as the turbine, combustor and augmentor sections of a gas turbine engine. In particular, the method of this invention entails a technique by which cooling holes can be formed in an air-cooled component after a thermal-insulating layer has been deposited on the surface of the component without damaging or spalling the thermal-insulating layer. The processing steps of this invention generally include forming a pilot or preliminary hole having a circular-shaped cross-section through a ceramic layer and a substrate protected by the ceramic layer. The hole can be formed by such techniques as drilling with an abrasive water jet, though it is foreseeable that the hole could be formed by another method. The hole defines an opening at the surface of the ceramic layer. The diameter of the hole is less than the final size required for the cooling hole. A high-pressure abrasive fluid stream is then directed into the hole to enlarge the cross-section of the hole and impart a noncircular shape to the opening by removing portions of the substrate and ceramic layer without removing the ceramic layer surrounding the resulting noncircular-shaped opening. According to the invention, the abrasive fluid stream is discharged from a source at a sufficient pressure and preferably through a nozzle whose diameter, distance from the surface of the ceramic layer, and angle relative to the central axis of the hole, yield the desired cooling hole and opening configuration.

In a preferred embodiment, the abrasive fluid stream is traversed across the surface of the ceramic through a series of nested or concentric patterns that are not concentric with the central axis of the hole. A particularly preferred method is to traverse the abrasive fluid stream through a nested series of trapezoidal patterns, in which the center of the short side of each trapezoidal pattern coincides with the central axis of the hole. The patterns are traversed with the smallest pattern first, and each successive pattern being incrementally larger until the desired form for the opening is obtained.

Preferably, the hole acquires the desired noncircular shape in the ceramic layer, but retains a circular shape in the substrate.

DESCRIPTION OF THE DRAWINGS

FIGS. 1 and 2 are sectional and plan views, respectively, of an airfoil having a thermal barrier coating system on its surface and a hole extending through the coating system and airfoil wall produced by using a preferred embodiment of this invention;

FIG. 3 represents an abrasive liquid jet discharge pattern on the surface of the coating system for enlarging the hole and sizing and shaping the surface opening of the hole produced by using a preferred embodiment of this invention; and FIG. 4 is a plan view of the airfoil and a cooling hole produced by the treatment of the hole shown in FIGS. 1 and 2 using the pattern shown in FIG. 3.

DETAILED DESCRIPTION OF THE INVENTION

The present invention is generally applicable to air-cooled components, and particularly those that are protected from a thermally and chemically hostile environment by a thermal barrier coating system. Notable examples of such components include the high and low pressure turbine nozzles and blades, shrouds, combustor liners and augmentor hardware of gas turbine engines. The advantages of this invention are particularly applicable to gas turbine engine components that employ internal cooling and a thermal barrier coating to maintain the service temperature of the component at an acceptable level while operating in a thermally hostile environment.

Referring to FIGS. 1 and 2, the method of this invention will be described in terms of a component 10, such as a turbine nozzle or blade airfoil, whose metallic substrate 12 is protected by a thermal barrier coating system composed of a bond coat 14 formed on the substrate 12, and a ceramic layer 16 adhered to the substrate 12 with the bond coat 14. As is the situation with high temperature components of a gas turbine engine, the substrate 12 may be an iron, nickel or cobalt-base superalloy. The bond coat 14 is preferably an oxidation-resistant composition, such as a diffusion aluminide or MCrAlY, that forms an alumina ($Al_2O_3$) layer or scale (not shown) on its surface during exposure to elevated temperatures. The alumina scale protects the underlying superalloy substrate 12 from oxidation and provides a surface to which the ceramic layer 16 more tenaciously adheres.

The ceramic layer 16 can be deposited by air plasma spraying (APS), low pressure plasma spraying (LPPS), or physical vapor deposition (PVD) techniques such as electron beam physical vapor deposition (EBPVD), the latter of which yields a strain-tolerant columnar grain structure. A preferred material for the ceramic layer 16 is zirconia partially stabilized with yttria (yttria-stabilized zirconia, or YSZ), though zirconia fully stabilized with yttria could be used, as well as zirconia stabilized by other oxides, such as magnesia (MgO), calcia (CaO), ceria ($CeO_2$) or scandia ($Sc_2O_3$).

The method of this invention entails producing a cooling hole 22 and opening 24 (shown in FIG. 4) through the ceramic layer 16, bond coat 14 and substrate 12, to achieve a configuration for the cooling hole 22 and opening 24 that provides more uniform distribution of cooling air across the external surface of the component 10. As shown in FIG. 4, the cooling hole opening 24 is configured as a diffuser of the type used with turbine nozzles to uniformly distribute a cooling air as a film across the nozzle surface. For this purpose, the shape of the opening 24 at the surface of the ceramic layer 16 diverges from the central axis of the cooling hole 22. As a result, the opening 24 roughly has a triangular shape that encourages cooling film development across the surface of the ceramic layer 16 as the cooling air flows away from the cooling hole 22. Those skilled in the art will appreciate that the transition from the circular-shaped cooling hole 22 to the noncircular-shaped opening 24 is critical, in that surface irregularities will impede air flow through the cooling hole 22, thereby reducing the amount of air flow exiting the opening 24 and negatively affecting the air flow distribution across the surface of the component 10 and the overall flow distribution within the cooling circuit containing the cooling hole 22 and opening 24.

As shown in FIG. 1, a first step of this invention is to form a hole 18 through the ceramic layer 16, bond coat 14 and substrate 12. The hole 18 is smaller in cross-sectional diameter than the cooling hole 22 required for the component 10. For example, for a cooling hole 22 having a diameter of about 0.035 inch (about 0.9 mm), the hole 18 is preferably formed to have a diameter of about 0.020 inch (about 0.5 mm), or roughly half that intended for the cooling hole 22. Suitable techniques for forming the hole 18 include drilling with an abrasive water jet, though it is foreseeable that the hole 18 could be formed by such other methods as casting, laser or EDM for non-TBC applications. As a result of the drilling operation, the hole 18 has a substantially uniform circular cross-section, as depicted in FIG. 1.

Once the hole 18 is formed, the component 10 is processed through a carefully controlled operation that uses a high pressure fluid stream targeted at the hole 18 to produce the cooling hole 22 and opening 24 shown in FIG. 4. While various fluids could be used, water is preferred as being environmentally safe and because it will not chemically affect the bond coat 14 or the underlying superalloy substrate 12. The water preferably contains an abrasive grit, which greatly enhances the cutting action. A suitable abrasive water jet is produced by pressures of at least about 200 bar, preferably about 550 bar, when discharged from a nozzle having one or more orifices. One or more orifices having diameters of about 0.05 to about 0.4 millimeter and spaced about 1.3 to about 9.5 centimeters from the surface of the ceramic layer 16 are suitable. A suitable abrasive flow rate is about 0.05 to 1.0 pounds per hour (about 0.023 to 0.45 kilograms per hour) using garnet or alumina particles of about 250 to 50 mesh. A preferred angle of attack for the abrasive water jet is within about five degrees of the central axis of the hole 18, though it is foreseeable that lesser and greater angles could be employed.

An abrasive water jet operation with the above parameters has been found to provide sufficient energy to enlarge the hole 18 to the size desired for the cooling hole 22 as well as generate the shape desired for the cooling hole opening 24. Because the operation uses mechanical energy rather than heat energy, it does not damage or spall the bond coat 14 or ceramic layer 16 surrounding the hole 18.

As shown in FIG. 3, the abrasive water jet is discharged toward the ceramic layer 16 while being traversed through a series of concentric or nested patterns that are not concentric with the central axis of the hole 18. FIG. 3 shows a preferred embodiment of the method of this invention, in which an abrasive water jet traverses through a nested series of trapezoidal patterns 20 at the surface of the ceramic layer 16 along the paths indicated by the arrows. As shown, the center of the short side of each trapezoidal pattern 20 coincides with the central axis of the hole 18. The patterns 20 are traversed with the smallest pattern first, with each successive pattern being incrementally larger until the desired form is obtained for the opening 24. With the completion of each pattern 20, the abrasive water jet continues on to the next pattern 20 surrounding the pattern 20 just completed. The series of patterns 20 may consist of any number of patterns 20, with a suitable number being readily ascertainable by experimentation.

Directing the abrasive water jet as shown in FIG. 3 serves on initial impact to generate the desired triangular shape for the opening 24, while the energy dissipated as the abrasive water jet continues down through the hole 18 to remove material from the substrate 12 serves to enlarge the hole 18. The result is the cooling hole 22 and opening 24 and noncircular shape 25 of the dashed line shown in FIG. 4. Importantly, the abrasive water jet operation of this invention is capable of precisely achieving the desired size and shape of the hole 22 and opening 24, without removing or damaging the bond coat 14 and ceramic layer 16 surrounding the cooling hole 22 and opening 24. Because the cooling hole 22 and opening 24 are not obstructed by the ceramic layer 16, the performance and service life of the component 10 are promoted by uniform film cooling of its external surfaces. Furthermore, the high-pressure abrasive water jet method of this invention can be controlled to precisely size and shape the cooling hole 22 and opening 24 in a manner that complements the geometry of the component 10, thereby further promoting the uniformity of the cooling air film.

The method is capable of appropriately sizing and shaping cooling holes and openings through a ceramic thermal barrier coating (TBC) and its underlying substrate, and is particularly suitable for producing noncircular-shaped diffuser-type openings that promote a uniform distribution of cooling film across the external surface of a component.

The abrasive fluid stream also serves to finish the hole and its opening, including the desired size and shape of the hole and opening, without removing or damaging the ceramic surrounding the cooling hole and opening. In addition to the advantages noted above, an unexpected result of this invention is that a high-pressure liquid jet produces a smooth transition between the circular-shaped cooling hole 22 in the substrate 12 and the noncircular-shaped opening 24 at the surface of the ceramic layer 16. Surprisingly, when compared to traditionally-shaped diffuser cooling holes formed by EDM, diffuser cooling holes formed in accordance with this invention have been determined to be about 50% more efficient in terms of cooling ability.

While the invention has been described in terms of a preferred embodiment, it is apparent that other forms could be adopted by one skilled in the art. For example, the geometry of cooling holes and openings can differ from that shown in the Figures. Furthermore, while the invention was described with reference to a component thermally insulated with a ceramic layer, the benefits associated with the cooling hole shape achieved with the method of the invention can be realized with air-cooled components without a ceramic layer. More particularly, these benefits are achieved by the manner in which the abrasive fluid stream is traversed through the series of nested or concentric patterns, which has been shown to produce the performance enhancing geometry described for the cooling hole. Therefore, the scope of the invention is to be limited only by the following claims.

What is claimed is:

1. A method of forming a shaped hole in a substrate protected by a ceramic layer, the method comprising the steps of:

forming a hole through the ceramic layer and in the substrate, the hole defining an opening at a surface of the ceramic layer; and directing an abrasive fluid stream into the hole to enlarge the cross-section of the hole within the substrate by removing portions of the substrate and to impart a noncircular shape to the opening.

2. A method as recited in claim 1, wherein the abrasive fluid stream is discharged from a source at a pressure of at least about 200 bar.

3. A method as recited in claim 1, wherein the abrasive fluid stream is discharged through an orifice having a diameter of about 0.05 to about 0.4 millimeters placed about 1.3 to about 9.5 centimeters from the surface of the ceramic layer.

4. A method as recited in claim 1, wherein the substrate includes a bond coat that adheres the ceramic layer to the substrate.

5. A method as recited in claim 1, wherein the abrasive fluid stream is directed at an angle within five degrees from a central axis of the hole.

6. A method as recited in claim 1, wherein the directing step proceeds by traversing the abrasive fluid stream through a series of nested patterns that are not concentric with a central axis of the hole.

7. A method as recited in claim 1, wherein the directing step proceeds by traversing the abrasive fluid stream through nested series of trapezoidal patterns, a first of the trapezoidal patterns having a side that coincides with a central axis of the hole.

8. A method as recited in claim 1, wherein the directing step causes the noncircular shaped opening to have a triangular shape.

9. A method as recited in claim 1, wherein the directing step causes the hole to have a noncircular shape in the ceramic layer and a circular shape in the substrate.

10. A method as recited in claim 1, wherein the substrate is a component of a gas turbine engine.

11. A method of forming a diffuser hole in an air-cooled component having a substrate, the method comprising the steps of:

drilling a hole having a circular-shaped cross-section and a central axis through the substrate, the hole defining an opening at a surface of the substrate; and directing an abrasive fluid stream into the hole to enlarge the cross-section of the hole and impart a triangular shape to the opening by traversing the abrasive fluid stream through a series of nested patterns that are not concentric with the central axis of the hole.

12. A method as recited in claim 11, wherein the abrasive fluid stream is discharged from a source at a pressure of at least about 200 bar.

13. A method as recited in claim 11, wherein the abrasive fluid stream is discharged through an orifice having a diameter of about 0.05 to about 0.4 millimeters placed about 1.3 to about 9.5 centimeters from the surface of the ceramic layer.

14. A method as recited in claim 11, wherein the abrasive fluid stream is directed at an angle of within about five degrees from the central axis of the hole.

15. A method as recited in claim 11, wherein the substrate includes a thermal-insulating ceramic layer, the drilling step entails drilling the hole through the ceramic layer, and the abrasive fluid stream removes portions of ceramic layer surrounding the hole to produce a triangular-shaped opening.

16. A method as recited in claim 15, wherein the component includes a bond coat that adheres the ceramic layer to the substrate.

17. A method as recited in claim 15, wherein the directing step causes the hole to have a triangular shape in the ceramic layer and a circular shape in the substrate.

18. A method as recited in claim 11, wherein the directing step proceeds by traversing the abrasive fluid stream through a nested series of trapezoidal patterns, a first of the trapezoidal patterns having a side that coincides with the central axis of the hole.

19. A method as recited in claim 11, wherein the component is a nozzle of a gas turbine engine.

20. A method of forming a diffuser hole in an air-cooled nozzle of a gas turbine engine, the nozzle having a ceramic layer adhered to a substrate of the nozzle with a bond coat, the method comprising the steps of:

drilling a hole having a circular-shaped cross-section and a central axis through the ceramic layer and the substrate, the hole defining an opening at a surface of the ceramic layer;

providing a fluid source at a pressure of at least 200 bar and an orifice having a diameter of about 0.05 to about 0.4 millimeters placed about 1.3 to about 9.5 centimeters from the surface of the ceramic layer;

discharging an abrasive fluid stream from the nozzle into the hole at an angle of within about five degrees from the central axis of the hole; and traversing the abrasive fluid stream through a nested series of trapezoidal patterns, a first of the trapezoidal patterns having a side that coincides with the central axis of the hole, the abrasive fluid stream thereby causing enlargement of the cross-section of the hole by removing portions of the substrate, bond coat and ceramic layer and imparting a triangular shape to the opening by removing the ceramic layer in a pattern resulting in a triangular-shaped opening.

\* \* \* \* \*